United States Patent Office 2,782,242
Patented Feb. 19, 1957

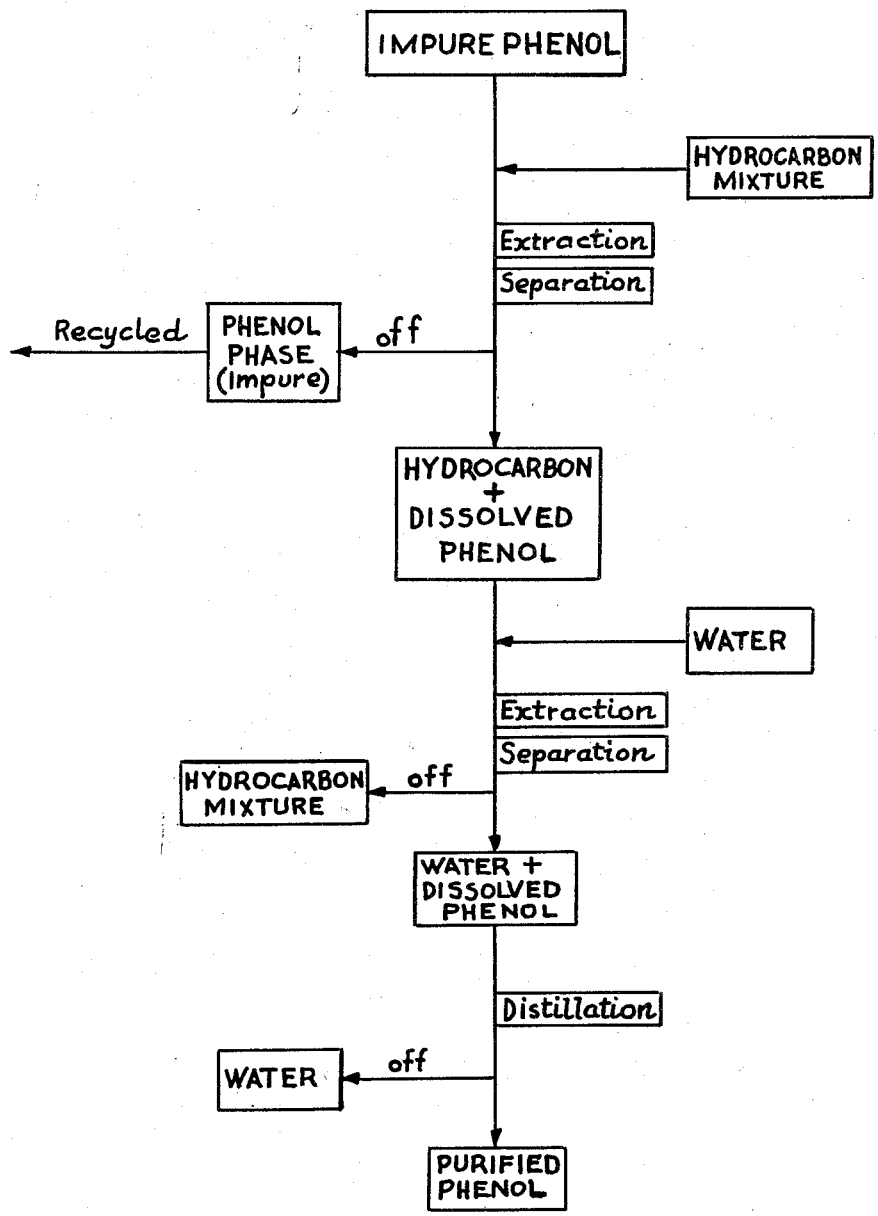

2,782,242

PURIFICATION OF PHENOL

James K. Clark, St. Lambert, Quebec, Canada, assignor to B. A.-Shawinigan Limited, Montreal, Quebec, Canada, a corporation of Canada Application September 23, 1954, Serial No. 458,001

10 Claims. (Cl. 260—621)

This invention relates to the purification of phenol especially that obtained by the process of oxidizing cumene to the hydroperoxide and splitting it to phenol and acetone.

Certain uses of phenol involve its chlorination, in which case colour produced by the reaction of the chlorine on impurities in the phenol is of considerable significance. Pure phenol gives only a trace of colour or none on chlorination; it has been found that some phenols give a degree of colour on chlorination which makes the phenol relatively unsuitable for certain uses. Attempts to remove from the phenol those substances which produce the colour on chlorination, by distillation and by various extractive or absorptive processes have hitherto been only partially successful. It appears probable that a number of different compounds contribute to the colour produced on chlorination.

I have now found that phenol made from cumene by way of the hydroperoxide may be purified so that on chlorination it develops only a very faint pink or yellowish-brown colour. The phenol is first extracted with a selected paraffin hydrocarbon or hydrocarbon mixture in an amount and at a temperature so that only two phases are produced, both liquid. The hydrocarbon phase is separated from the phenol phase and extracted with water in an amount and at a temperature which gives only two liquid phases. Purified phenol is recovered from the aqueous phase, after separation from the hydrocarbon phase, by known methods, for example, by distillation, with or without an intermediate salting out operation.

The accompanying drawing is a flow sheet illustrating an embodiment of this invention. As shown in the flow sheet impure phenol is first extracted with an hydrocarbon mixture, the resulting phenol phase is separated and optionally discarded or recycled, the hydrocarbon plus dissolved phenol phase is extracted with water, the resulting hydrocarbon layer is separated, and the water plus dissolved pure phenol phase is distilled to separate the water and the purified phenol.

The phenol may be recovered from the phenol phase of the first extraction by distilling off the hydrocarbon leaving phenol with a higher Colour Index but otherwise of the same quality as the original phenol so that it is of sufficiently good quality for many puropses. Likewise the hydrocarbon phase of the second extraction may be treated by known methods for the recovery of pure hydrocarbon and second-grade phenol. The hydrocarbon recovered from these two operations may be used for further extractions. However, these recovery and recycling operations are not an essential part of the invention.

The hydrocarbon to be used for the first extraction is selected from the group consisting of the alkanes containing from six to nine carbon atoms and mixtures thereof. However, the alkanes in this group with the highest boiling points are less desirable than the other, since the smaller difference between their boiling points and that of phenol (181° C.) increases the difficulties of getting a sharp separation of the hydrocarbon and phenol by distillation. It is preferred to use only those alkanes from the above-noted group having boiling points not greater than 135° C. In conformity with customary usage, the term "alkanes" does not include cycloalkanes, but these and aromatic hydrocarbons having similar boiling points may be present in the alkanes as an impurity not exceeding a few percent.

The selection of the temperature and the relative amounts of phenol and of hydrocarbon to be used in the first extraction to give two liquid phases is made in accordance with well-known principles. The melting point of phenol is about 42° C. but in the presence of the specified hydrocarbons it melts at temperatures as low as about 30°, depending on the hydrocarbon. Thus, the minimum temperature of extraction may be as low as about 30°. Furthermore, all mixtures of phenol and the specified hydrocarbons just above this temperature give two liquid phases (except those containing either quite small amounts of phenol or of hydrocarbon); but as the temperature is raised the two phases become completely miscible, so that the maximum temperature may range from about 34°–35° to over 70° depending on the hydrocarbon and on the relative amounts of phenol and hydrocarbon.

Similarly, in the second extraction the selection of the temperature and the relative amounts of water and of the hydrocarbon phase from the first extraction follows well-known principles. At or near room temperature the addition of a small amount of water to the said hydrocarbon phase produces three separate phases: (a) alkane-rich, (b) water-rich, and (c) phenol-rich. On the addition of more water, phases b and c become completely miscible, leaving only the required two liquid phases. Excessive quantities of water are obviously undesirable for they will increase the cost of recovering the purified phenol. For convenience, it is preferred to operate at about room temperature.

For convenience in defining the quality of phenol with respect to the colour developed on chlorination, an arbitrary test was established. Chlorine is bubbled into a five ml. sample of molten phenol at 50° C. at the rate of two bubbles per second. The colour of the molten phenol is compared with that of arbitrary standards numbered from one to seven and the "Colour Index" of the phenol is taken as that of the standard which it most closely matches. The standards, which are freshly prepared every two weeks, are kept in bottles of about 20 mm. inside diameter and are made up as follows:

Solution A is made up of 2.00 grams of potassium thiocyanate diluted to 200 mls. with distilled water. Solution B is made up of 2.00 grams of ferric chloride hexahydrate diluted to 200 mls. with distilled water. Solution C is made up of 180 mls. of solution A plus 20 mls. of solution B. Standards 1 to 7 are made up by diluting 0.5, 1.0, 1.5, 2.0, 3.0, 4.0, and 5.0 mls., respectively, of solution C to 10 mls. with distilled water.

The invention is illustrated by the following examples.

*Example 1*

A first extraction was carried out by adding 300 mls. of phenol, made from cumene by way of cumene hydroperoxide and having a Colour Index of 3, to 300 mls. of n-heptane (A. S. T. M. reference fuel grade) and shaking the mixture together at 47° C. for five minutes. The two resultant clear, liquid phases were separated while the temperature was held at 47° C. The heptane phase amounted to about 240 mls. and contained 14.2% by weight of phenol. A second extraction was carried out by shaking this heptane phase for a few minutes with about 1200 mls. of water at room temperature, about 22° C. After separating the phases the phenol was salted out of the aqueous phase by adding to it an excess of sodium chloride crystals to produce a brine phase and a phenol phase. The phenol was recovered from the phenol phase by distilling off the traces of hydrocarbon, the water and then the phenol using an Engler distilling flask. In order to make comparisons, some phenol was also recovered from the phenol phase of the first extraction by distilling off the heptane content. Some phenol was also crystallized from the heptane phase of the first extraction of a duplicate experiment by cooling this phase to about 15° C. The Colour Indexes of the various phenols were found to be as follows:

(a) The original phenol _____ 3
(b) Phenol from the phenol phase of the first extraction _____ 5½
(c) Phenol from the heptane phase of the first extraction _____ 2 or less
(d) The final purified phenol _____ 1 or less

Example 2

A first extraction was caried out by adding 300 mls. of phenol, made from cumene by way of cumene hydroperoxide and having a Colour Index of 3, to 300 mls. of so-called iso-octane (2,2,4-trimethyl pentane, A. S. T. M. reference fuel grade) and shaking the mixture together at 47° C. for five minutes. The two resultant clear, liquid phases were separated while the temperature was held at 47° C. The octane phase amounted to about 220 mls. and contained 10.4% by weight of phenol. A second extraction was carried out by shaking this octane phase for a few minutes with about 500 mls. of water at room temperature, about 22° C. This operation yielded two liquid phases which were separated, the octane phase amounting to 200 mls. containing 0.8 gram of phenol per 100 mls., and the aqueous phase amounting to 515 mls. containing 4.2 grams of phenol per 100 mls. Most of the phenol was salted out of the aqueous phase by adding to it an excess of sodium chloride crystals to produce a brine phase and a phenol phase. The phenol was recovered from this phenol phase by distilling off the traces of hydrocarbon, the water and then the phenol using an Engler distilling flask. This purified phenol amounted to 18.4 grams (some phenol was lost as a heel in the flask); its Colour Index was found to be less than one, estimated at one-half.

Example 3

It was found that phenol of substantially the same excellent Colour Index was obtained by repeating Example 2 except that 30 mls. of water were used for the second extraction, instead of 500 mls.

Examples 4-5

In these examples the first extraction was carried out as in Example 2 except that the temperatures were 38° C. and 60° C. respectively, yielding octane phases of 240 mls. and 186 mls. containing 9.1 grams and 11.5 grams of phenol respectively per 100 mls. The subsequent extractions and recoveries were carried out in a manner similar to that in Example 2 giving phenol with a Colour Index of one or less.

While I do not wish to limit my invention by any theory of the mechanism by which the phenol is purified, it is plausible to suggest that the first extraction leaves behind in the phenol phase those impurities (presumably polar compounds) which are insoluble in alkanes, and the second extraction leaves behind in the hydrocarbon phase those impurities (presumably non-polar compounds) which are insoluble in water.

I claim:
1. A process for the purification of phenol made from cumene by way of the hydroperoxide comprising (a) first extracting the said phenol with a hydrocarbon liquid selected from the group consisting of the alkanes containing 6 to 9 carbon atoms and mixtures thereof in an amount and at such a temperature that only two phases are produced, both liquid, rich in phenol and in hydrocarbon respectively, (b) separating the said hydrocarbon phase from the phenol phase, (c) extracting the said hydrocarbon phase with water in an amount and at a temperature such that only two liquid phases are produced, rich in hydrocarbon and in water respectively, and (d) recovering the purified phenol from the aqueous phase.

2. A process as claimed in claim 1, wherein the boiling point of the alkanes does not exceed 135° C.

3. A process as claimed in claim 1 wherein the liquid hydrocarbon is n-hexane and the first extraction is carried out at a temperature within the range 31°-34° C.

4. A process as claimed in claim 3 wherein the second extraction is carried out at about room temperature with water in an amount ranging from about one and one-half to about five volumes of water for each volume of the hydrocarbon phase from the first extraction.

5. A process as claimed in claim 1 wherein the liquid hydrocarbon is n-heptane and the first extraction is carried out at a temperature within the range 35°-53° C.

6. A process as claimed in claim 5 wherein the second extraction is carried out at about room temperature with water in an amount ranging from about one and one-half to about five volumes of water for each volume of the hydrocarbon phase from the first extraction.

7. A process as claimed in claim 1 wherein the liquid hydrocarbon is 2,2,4-trimethylpentane and the first extraction is carried out at a temperature within the range 32°-66° C.

8. A process as claimed in claim 7 wherein the second extraction is carried out at about room temperature with water in an amount ranging from about one and one-half to about five volumes of water for each volume of the hydrocarbon phase from the first extraction.

9. A process as claimed in claim 1 wherein the liquid hydrocarbon is a mixture of alkanes having a boiling range of 75°-90° C. and the first extraction is carried out at a temperature within the range 32°-34° C.

10. A process as claimed in claim 9 wherein the second extraction is carried out at about room temperature with water in an amount ranging from about one and one-half to about five volumes of water for each volume of the hydrocarbon phase from the first extraction.

References Cited in the file of this patent
UNITED STATES PATENTS

| | | |
|---|---|---|
| 1,830,725 | Ulrich | Nov. 3, 1931 |
| 2,382,944 | Porter | Aug. 14, 1945 |
| 2,663,743 | Bewley et al. | Dec. 22, 1953 |
| 2,744,144 | Sheffield | May 1, 1956 |